Patented May 5, 1931

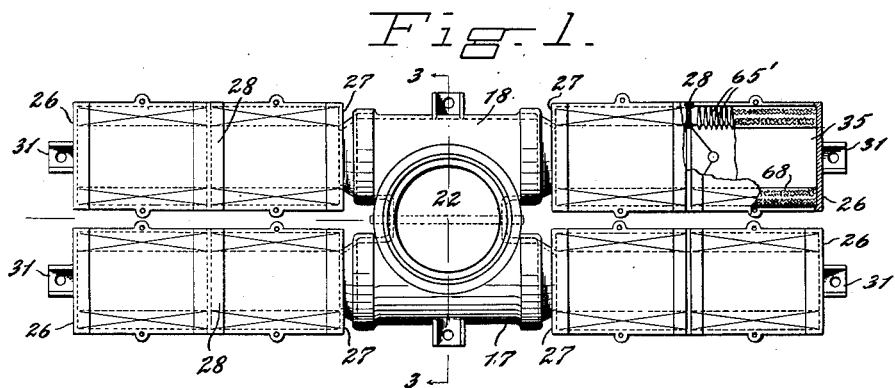
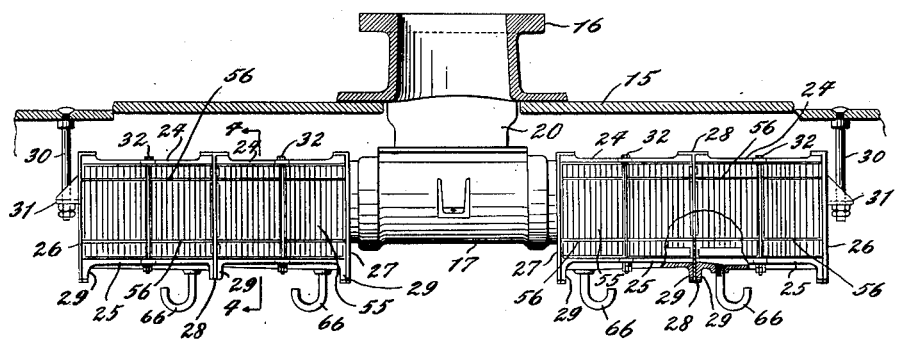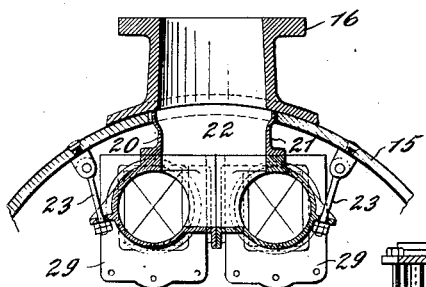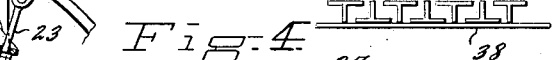

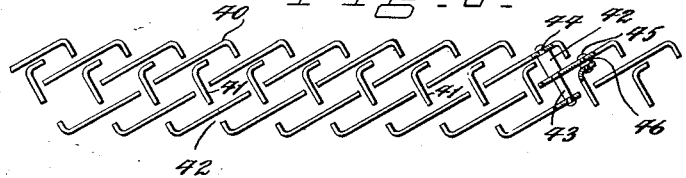
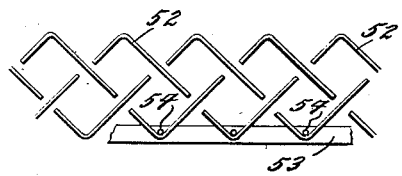
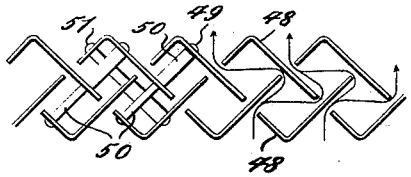
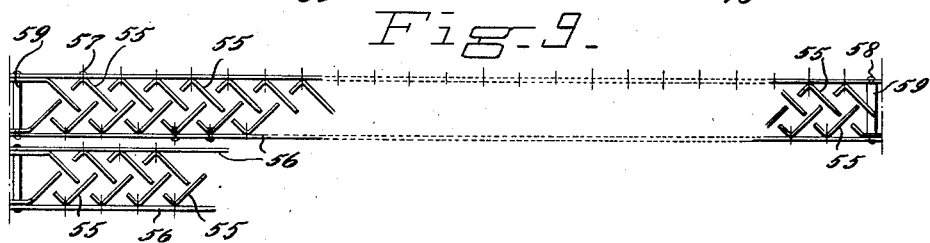
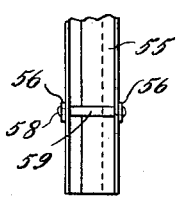
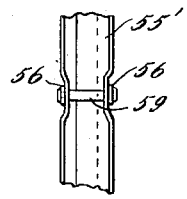
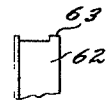

1,803,381

UNITED STATES PATENT OFFICE

CHRISTOPHER HUMPHREY DAVY, OF BECKENHAM, ENGLAND, ASSIGNOR TO THE BABCOCK & WILCOX COMPANY, OF BAYONNE, NEW JERSEY, A CORPORATION OF NEW JERSEY

DRY PIPE

Application filed October 26, 1926, Serial No. 144,206, and in Great Britain January 1, 1926.

This invention relates to dry pipes, particularly applicable to steam boilers, for removing the entrained moisture or water drops from the steam delivered from the boiler.

The invention will be best understood from the following description and the appended drawings of an illustrative form of my invention, in which Fig. 1 is a plan view, partly broken away, of the dry pipe assembled for installation; Fig. 2 is an elevation showing the dry pipe installed within a boiler steam and water drum and taken through the center line of the outlet of the drum and showing a dry box partly in section; Fig. 3 is a cross-section on line 3—3 of Fig. 1; Fig. 4 is an enlarged cross-section on line 4—4 of Fig. 2; Figs. 5 to 9 are plan views of various forms of baffle vanes showing their assembled relationships, and Figs. 10 to 13 are details of fastening means for angle vanes.

Like reference characters indicate like parts throughout the drawings.

In the illustrative embodiment, the dry pipe is mounted within a steam drum 15. A nozzle 16 provides attachment for the steam outlet pipe (not shown) which conveys the steam to the point of use.

In the form illustrated, the dry pipe is made up of two portions in parallel, each portion having a central pipe section and a dry box at each end of this central section. Obviously, any number of dry boxes, from one up to any desired number, may be used. In the illustrative form, the central pipe section is made up of a pair of castings 17, 18 having their flanges connected and having upwardly extending flanges 20, 21 to form a central chamber 22 communicating with the nozzle 16. This central section is suspended by eye-bolts 23 from the drum shell.

Each dry box is formed of top plates 24, bottom plates 25, an outside end plate 26 and an inside end plate 27, the latter having an opening through which a reduced end of one of the pipe castings 17, 18 extends. The side walls of each dry box, in the illustrative embodiment, form the entrance to the dry box and are made up of a plurality of baffles to be described more in detail hereinafter, the baffle arrangement shown in Figs. 1 and 2 being that of Fig. 9.

Each dry box is preferably made up in sections, two being shown in the illustrative form, these sections being connected by a frame member 28 extending between the flanges of top plates 24 and bottom plates 25 and secured in place by bolts extending through the flanges 29 of the bottom plates 25 and the member 28. The frame 28 has a T-shaped head extending over and sealing the adjacent edges of the top plates 24. Suspension rods 30 extending through lugs 31 support the outer ends of the dry boxes. Each dry box may be made as long as desired by adding sections by means of the connecting frames 28.

Rods 32 extend between the top and bottom plates 24, 25 and, by means of the bottom nuts on these rods, the top plate 24 may be drawn toward the bottom plate 25 to form a tight joint between such plates and the ends of the baffle elements forming the side walls of the dry boxes, and this pressure will also serve to hold such elements in position. The baffle elements are so arranged as to provide tortuous passageways 34 between and connecting the steam space of the drum and the central passage 35 of each dry box, which, in turn, communicates with the opening in the end plate 27 and thence to the nozzle 16. The steam flows horizontally in Fig. 4, for instance, from the steam space of the drum, through the passages formed by the baffle elements, into the passage 35 and from thence flows into the central chamber 22 and out of the nozzle 16.

The baffles may be made up in any one of many different forms, some of which are illustrated in Figs. 5 to 9, inclusive. In each case, the baffle elements are so arranged that there is a plurality of long vertical slots or passageways through which the steam may flow and these passageways are so arranged that the steam is diverted a plurality of times from its normal path before it reaches the central passage 35, each diversion preferably being accompanied by an expansion and a contraction of the flow area.

In the form shown in Fig. 5, the baffles are made up of vanes formed of T-bars 37 arranged in rows paralleling the axis of the dry box with the successive flanges turned alternately toward the outside and toward the inside of the dry box. The several T-bars may be connected by longitudinally extending bars 38 to hold the individual T-bars in spaced relation, one of such bars being shown in Fig. 5. It will be understood that as many of these bars as will be found necessary will be provided and will be spaced along the length of the T-bars. The bars 38 may be attached to the T-bars by riveting or brazing or in any suitable manner.

In the form shown in Fig. 6, the baffles are formed of vanes of angle sections 40, 41, the former having a much longer leg than the latter. The several vanes 40, 41 may be held together to form a rigid structure by spacers 42 and 43 through which extend connecting rods 44, the latter having their ends riveted over, and also by rivets 45 and spacers 46. Only one of each of these fastening devices is shown in this figure, but it will be understood that each vane is connected to the adjacent vane by a similar arrangement, and that there may be a number of such connections spaced vertically on each vane.

The arrangement shown in Fig. 7 is similar to that of Fig. 6, except that the vanes 48 are all alike in cross-section, the several vanes being held in place by connecting rods 51 and spacing members 50, 50' in the manner heretofore described.

In each of the forms appearing in Figs. 6 and 7, it will be seen that there is provided two rows of vanes, each vane of angle section. In each row are sections having legs which extend towards legs on sections in the other row. For example, in Fig. 6 the longer legs of the sections are thus arranged, while in Fig. 7 is found a long leg of a section in one row and a short leg of a section in the other row arranged in a similar fashion. In either case a transverse member is disposed between the spaced ends of the legs of the two sections, in Fig. 6 this member comprising a leg of one of the angles 41 and in Fig. 7 comprising a leg of another angle in one of the two rows.

In Fig. 8, the baffle vanes 52 are the same in shape and arrangement as in Fig. 7, but they are held in spaced relation by means of a bar 53 which is entered in a slot cut in the angle of each vane 52, a pin 54 through the bar 53 holding the vane to the bar 53. Here, again, as many of the bars 53 as desired may be spaced vertically on each vane, only one of them being shown in Fig. 8.

In Fig. 9, the baffle vanes 55 are connected at their angles to bars 56 by rivets 57 through the angles of the vanes, the ends of the bars 56 being held in spaced relation by connecting rods 58 and spacers 59.

Fig. 10 is an enlarged end view of a portion of Fig. 9, showing the bars 56 and their connection to the baffle vanes 55. If it is desired to have the bar 56 arranged so that a number of baffle elements, each made up of its vanes and connecting bars, can be placed closely together side by side, then each baffle vane 55' (which is otherwise the same as vane 55), may be bent in at its angle, as shown in Fig. 11, so that the connecting bar 56 will be inside of the normal position of the angle of the vane.

In Figs. 12 and 13 is shown still another form of means for connecting the baffle vanes in spaced relation. In this case, the upper and the lower ends of each vane 62 are formed with projections 63 which are entered into appropriate openings in a top and a bottom plate 64 and, if desired, the projections 63 may be riveted over so as to form a rigid construction.

In each of the forms of baffle constructions shown, each set of baffle vanes is held in spaced relation so as to form a unitary structure, which, in turn, will be held against the steam pressure by the clamping of the ends of the vanes between the top plate 24 and the bottom plate 25 of the dry box by means of the rods 32.

As the steam flows through the tortuous passages formed by the baffle vanes, the drops of water in the steam will adhere to the vanes and trickle to the bottom plate 25. This bottom plate is preferably formed with a central gutter 65 and the portion of the bottom plate beneath each baffle element is preferably provided with gutters 65' to lead the water directly into the central gutter.

Each of the dry boxes is provided at the lowest part of the central gutter 65 with a U-tube 66 forming a trap so that the water collected in the steam may flow back to the water space of the drum 15 and, at the same time, such water trap will form a seal to prevent the entering of steam directly into the central passage 35.

To prevent the steam flow from carrying the water from the central gutter into the central chamber 22, one or more plates 68, spaced from the bottom of the gutter, may be provided. In the form shown, this plate 68 is supported on a pair of legs 69, its edges being positioned between a pair of baffle vanes to prevent displacement.

It will be understood that the arrangement which I have shown is merely illustrative and that the embodiment of my invention will be widely varied.

I claim:

1. In a device of the class described, two adjacent substantially parallel rows of vanes of angular cross section disposed with the angles in one row facing those in the other and with a vane in one row having a leg extending toward a leg of a vane in the other row, the ends of said legs being spaced from each other, and transverse members extending between said spaced ends and spaced therefrom.

2. In a device of the class described, two substantially parallel rows of vanes of angular cross section disposed with the angles in one row facing those in the other and with a vane in one row having a leg extending toward a leg of a vane in the other row, the ends of said legs being spaced from each other, and legs of other vanes in one of said rows extending between said spaced ends and spaced therefrom.

CHRISTOPHER HUMPHREY DAVY.